E. D. BARRETT.

FLUSH VALVE.

APPLICATION FILED JAN. 6, 1908.

Reissued May 4, 1909. 12,951.

Witnesses:
E. G. Duvall
L. H. Amsler

Ernest D. Barrett,
Inventor:

By his Attorneys,
Byrnes, Townsend & Lawrence.

UNITED STATES PATENT OFFICE.

ERNEST D. BARRETT, OF NEW YORK, N. Y., ASSIGNOR TO FLUSHOVALVE COMPANY, OF NEW YORK, N. Y., A CORPORATION OF NEW YORK.

FLUSH-VALVE.

No. 12,951. Specification of Reissued Letters Patent. Reissued May 4, 1909.

Original No. 816,290, dated March 27, 1906, Serial No. 216,847. Application for reissue filed January 6, 1908. Serial No. 409,598.

*To all whom it may concern:*

Be it known that I, ERNEST D. BARRETT, a citizen of the United States, and a resident of New York, in the county of New York and State of New York, have invented a new and Improved Flush-Valve, of which the following is a full, clear, and exact description.

My invention relates to a valve which is capable of general use, but is especially applicable to the use in flushing closets.

The principal object of my invention is to provide means for permitting a sudden rush of water through the valve when opened, whether the admission-pipe is the same size as the outlet-pipe or smaller, and to provide for the gradual closing of the valve, so that a constant stream will pass through for some time without the necessity of holding the valve open.

Further objects of the invention will appear in the course of the subjoined description.

Reference is to be had to the accompanying drawings, forming a part of this specification, in which similar characters of reference indicate corresponding parts in both the figures.

Figure 2:
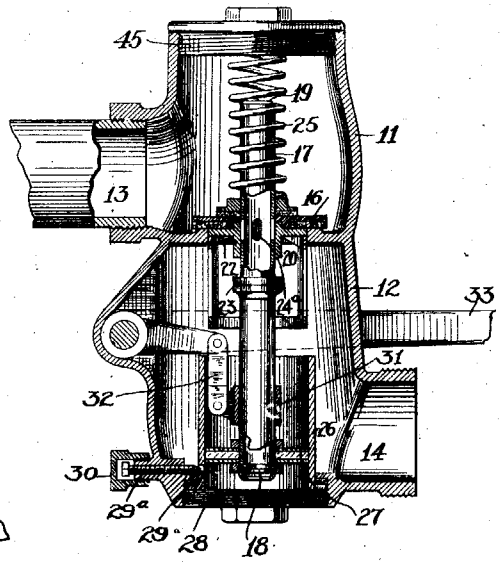
Figure 1:
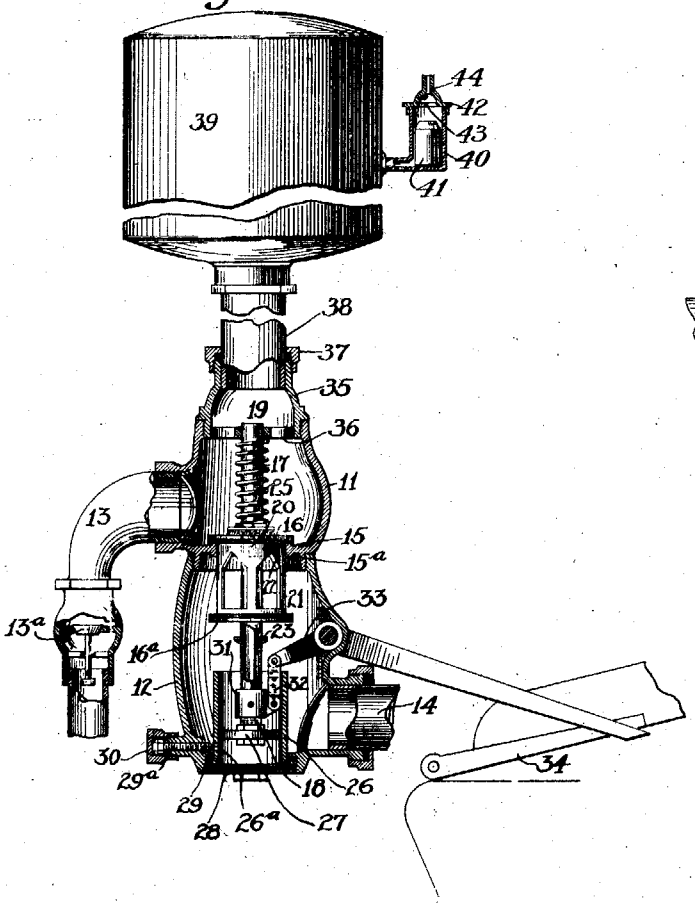

Figure 1 is a side elevation showing a preferred form of my invention with parts in section; and Fig. 2 is a similar view, on an enlarged scale, showing certain modifications.

In the form shown in Fig. 1 the valve-casing is shown as consisting of two parts 11 and 12, each containing a chamber for the reception of water. These two parts are shown as being removably secured together; but they may be fastened in any other desired manner than the one shown and may be integral with each other, if desired. 13 is a feed-pipe and 14 an outlet-pipe. 15 is a valve-seat provided for a valve 16. A second valve-seat $15^a$ is provided below the valve-seat 15 and facing in the opposite direction, and a valve $16^a$ is provided for co-acting with this valve-seat. The two valves are provided with a hollow stem 17, which has a check-valve 18 at the bottom and is closed at the top 19. It is also provided with a series of perforations 20, all of the same height, and providing communication between the interior of the stem and the chamber in the casing 11. The two valves 16 and $16^a$ are secured together by means of a skeleton framework 21, which depends from the valve 16 and supports the valve $16^a$ at its bottom. At the top of the skeleton frame are a series of triangular or other projections 22, designed for the purpose of permitting the water to escape with less impetus at the instant at which the valve is raised. The valve-stem 17 is not connected directly with the valves 16 and $16^a$, but the latter are slidably mounted thereon, and a projection 23 is formed upon the valve-stem for the purpose of coming into contact with a member secured to the valve or its frame, so that when the valve-stem is raised the first action will be to permit the stem alone to ascend and to expose the openings 20, so that water may pass through them from the chamber in the casing 11; but when the projection 23 strikes the element above mentioned it will cause the two valves and their frame to be raised. In Fig. 1 the element which the projection 23 strikes is the lower surface of the valve $16^a$; but in the form shown in Fig. 2 a collar $24^a$ is provided, which is connected with the valve 16 and will operate in the same manner. A spring 25 is provided for normally holding the valves down. 26 is a dash pot or cup secured near the bottom of the casing 12 in any desired manner or cast integrally therewith. Within this dash-pot a piston 27 is mounted, which is designed to reciprocate with the valve-stem 17 and is consequently mounted thereon. 28 is a closure for the bottom of the casing 12, and when the dash-pot is formed in a separate piece from the casing 12 this closure is designed to securely hold it in position. The lower part of the dash-pot 26 is provided with an opening $26^a$, which is designed to be closed by a needle-valve 29, mounted on a screw $29^a$, which is designed to be operated back and forth to regulate the size of the passage for the exit of water from the dash-pot. The head of the screw may be covered by a cap 30 to protect it. Secured to the valve-stem 17 is a collar 31, connected by a link 32 to a pivoted lever 33. This lever, if desired, may be connected to the seat 34 or other operating device. The top of the casing 11 is closed by a cap 35, which has a frame 36 for the guidance of the valve-stem 17, and is provided with a packed cap 37 for securely closing the joint between it and a pipe 38, which is provided for connecting the chamber 11 with a tank 39. This tank is shown in Fig. 1 as being broken away and is preferably of considerable height. Near the top of it is a casing 40 for a float-valve 41. This casing is provided with a cap 42, which has a valve-seat 43 and an outlet 44. This tank is designed to be used only when the inlet-pipe 13 is smaller than the outlet pipe 14, in which case a check-valve 13ª is employed in the pipe 13.

The operation of the device is as follows: Water entering through the pipe 13 will not be impeded by the check-valve 13ª, which works to permit water to pass upwardly through it and to prevent passage in the other direction. Supposing the valve 16 to be closed, the water will fill the chamber 11 and the tank 39 up to the level of the inlet of the casing 40. It will then enter the latter and cause the valve 41 to float and be seated in an obvious manner. This will prevent the further exit of air through the opening 44; but more water can flow into the tank on account of the compressibility of the air remaining therein above the inlet of the casing 40. On account of this arrangement, water will pass through the check-valve 13ª of the pipe 13 until the pressure of the water in the tank 39 is equivalent to the pressure upon the mains. The check-valve will then prevent a reduction of the pressure in the tank. If now the lever 33 is rocked upon its pivot by any means, the valve-stem 17 will be caused to rise through the instrumentality of the link 32 and the collar 31. The first effect of this will be to force the openings 20 above the surface of the valve 16 without disturbing the latter. Pressure of the water upon the top of the valve 16 will be sufficient to keep the latter in closed position, because the only force acting to raise it would be the friction between the stem 17 and the valve. The exposure of the openings 20 to the water in the casing 11 will permit the water to flow through the openings and down through the tube 17. The check-valve 18 is designed to open downwardly so as to permit the water to flow through the tube 17 and into the dash-pot under the piston 27. Upon turning the lever 33 farther around its pivot the stem 17 will rise sufficiently to cause the projection 23 to engage with the lower surface of the valve 16ª. This will force the whole frame 21 and both valves upwardly, unseating the valve 16 and permitting the water in the casing 11 and tank 39 to flow through the frame 21 into the casing 12 and out through the pipe 14. This will be accomplished by the exertion of pressure on the seat 34. The complete closing of the seat will cause the valve 16ª to be seated upon its seat 15ª. This will stop the flow of water until the seat is raised, when the valve 16ª will be caused to drop to a certain extent and permit water to again flow through the device as before. The pressure on the mains will cause additional water to be supplied immediately; but it will not flow fast enough to provide for the outlet of water through the pipe 14, and consequently the level of water in the tank 39 will be lowered. When it is lowered below the casing 40, the float-valve 41 will drop and air will be admitted through the opening 44. Up to this time the pressure of the confined air above the casing 40 will assist the natural pressure of the water in causing a rapid flow.

The purpose of the dash-pot is to prevent the rapid closing of the valve 16 and to allow sufficient time to elapse to substantially empty the tank 39 and to provide for the necessary flow of water through the device. It will be obvious, that, as the only outlet from the dash-pot 26 is through the opening 26ª the flow of water from the dash-pot will be very slow and the water will all pass through the opening 26ª, which is regulated by the screw 29ª.

It will be obvious that as the piston 27 gradually descends in the dash-pot it will permit the valve-frame, which rests upon the projection 23, to descend with it, and when the valve 16 is seated the valve-stem 17 will be forced to continue its descent by the spring 25, so that the flow of water through the openings 20 will be entirely cut off and the piston 27 will assume its lowest possible position.

In the form shown in Fig. 2 the pipe 13 is shown as the same size as the pipe 14. Consequently the tank 39 and its accessories, as well as the check valve 13ª, may be dispensed with. In place of the tank and of the cap 35 a plug 45 is provided for closing the top of the chamber 11. In this form the two casings 11 and 12 are shown as integral. The construction of the valve 16 and collar 24ª is shown in section in this figure; but it is to be understood that the collar 24ª is somewhat modified and it necessarily is provided with a downwardly projecting portion which is adapted to contact with the projection 23 when the valve 16ª is omitted, as is the case in the construction shown in this figure. The other parts shown in this figure are substantially the same as those shown in Fig. 1.

Having thus described my invention, I claim as new and desire to secure by Letters Patent—

1. A flush-valve comprising a valve proper, a hollow stem having an open lower end provided with a check-valve and perforations through its walls, means for closing said perforations, a piston rigidly attached to said valve-stem and a dash-pot in which said piston is adapted to reciprocate.

2. A flush-valve comprising a valve proper, a hollow stem upon which said valve is slidably mounted, said stem having a closed upper end, an open lower end provided with a check-valve and intermediate perforations in its walls and provided with a projection, said projection being adapted to engage the valve and move it with the piston.

3. A flush-valve comprising a hollow stem having a closed upper end, an open lower end and perforations in its walls, a valve slidingly mounted on the stem and adapted to close all of said perforations and prevent the admission of water to the interior of said hollow valve-stem, a piston on the stem and a dash-pot in which said piston is adapted to move.

4. The combination of a hollow stem having a closed end, an open end and perforations in its walls, a valve slidingly mounted thereon, a piston attached to the valve-stem and movable independently of the valve, a dash-pot in which said piston is adapted to reciprocate, means for raising the valve-stem, and means for causing the valve-stem to engage with the valve during a portion of its upward movement.

5. The combination of a valve-casing, a tank in communication with the upper part of said casing, means for feeding water to said tank, a valve located below the top of said tank and adapted to admit the passage of air therethrough, means for closing said valve when the height of water in the tank reaches the level of the valve, a partition in said casing having valve-seats on opposite sides thereof, a valve-stem, two valves mounted on said stem, a skeleton frame for connecting said valves, means in the casing for forcing the upper valve toward its seat, a piston on said valve-stem below the valves, a cup adapted to receive the piston, said cup having a passage in the wall thereof below the piston, a needle-valve for controlling the outlet of water through said passage, means for moving said valve-stem and piston.

6. The combination of a casing provided with two valve-seats, two valves, a frame, having passages in its walls and a central passage, for rigidly connecting said valves together, means for forcing one of said valves toward its seat, a valve-stem connected with said valves, a piston on the valve-stem, a cup for receiving said piston and retarding the motion of the latter, and means for forcing the piston into the cup and seating one of the valves.

7. The combination of a casing having a partition provided with a valve-seat on each side thereof, a valve-stem, a skeleton frame connected with said stem and having passages therethrough for water, two valves in said skeleton frame adapted to seat on the opposite sides of the valve-seat, a cup surrounding the valve-stem, and a piston on the valve-stem normally in the cup, adapted to enter the cup, said cup having an adjustable outlet.

8. A flush-valve, comprising a casing provided with an inlet opening and an outlet opening, a transverse partition in said casing intermediate said openings, provided with an aperture and forming an inlet chamber and an outlet chamber respectively, a valve seat surrounding said aperture, a main valve arranged to normally seat thereon and control the flow of fluid through said aperture, a piston, distant from said main-valve and secured thereto, a dash-pot in which said piston is arranged to reciprocate, said dash-pot being provided with a relatively small outlet-aperture positioned intermediate the inner face of said piston, when at the innermost limit of travel, and the inner end of said dash-pot, regulatable closure-means registering with said aperture, arranged to remain stationary irrespective of the position of the said piston, whereby during the inward stroke of the said piston, a uniform flow through said aperture of the water confined beneath said piston, during a predetermined period, is secured, means provided with a fluid passage affording communication with said dash-pot independently of the aperture in said partition, capable of permitting the escape of fluid confined by the main valve in the inlet chamber prior to the unseating thereof, an auxiliary valve controlling the escape of fluid confined in said inlet chamber through said means, an inlet valve controlling the admission of fluid into said dash-pot and below the piston therein, and means for successively actuating said auxiliary valve and said main valve respectively.

9. A flush-valve, comprising a casing provided with an inlet opening and an outlet opening, a transverse partition in said casing, intermediate said openings, provided with an aperture and forming an inlet chamber and an outlet chamber respectively, a valve-seat surrounding the aperture in said partition, a main valve arranged to normally seat thereon and thereby cut off the passage of water through said aperture, a piston, distant from said main-valve and secured thereto, a dash-pot in which said piston is arranged to reciprocate, said dash-pot being provided with a relatively small outlet-aperture, an adjusting screw extending through the casing of the outlet chamber and adjustable from the outside thereof, a needle-valve on the inner end of said adjusting-screw, adapted to register with said aperture and arranged to remain stationary irrespective of the position of the said piston, whereby, during the inward stroke of the piston, a uniform flow through said aperture, of water confined beneath said piston, during a predetermined period, is secured, means provided with a fluid passage affording communication with said dash-pot independently of the aperture in said partition, capable of permitting the escape of fluid confined by the main valve in the inlet chamber, prior to the unseating thereof, an auxiliary valve controlling the escape of fluid, confined in said inlet chamber, through said means, an inlet valve controlling the admission of fluid into said dash-pot and below the piston therein, and means for successively actuating said auxiliary valve and said main valve respectively.

ERNEST D. BARRETT.

Witnesses:

W. H. SWENARTON,

CHARLES E. WIRZ.